Aug. 7, 1923.

J. S. DAWLEY 1,463,802

METHOD OF PREPARING FILMS FOR KINETOSCOPES

Filed Sept. 8, 1919

INVENTOR
James Searle Dawley
By Everett W Varney
Atty.

Patented Aug. 7, 1923.

1,463,802

UNITED STATES PATENT OFFICE.

JAMES SEARLE DAWLEY, OF NEW YORK, N. Y.

METHOD OF PREPARING FILMS FOR KINETOSCOPES.

Application filed September 8, 1919. Serial No. 322,461.

*To all whom it may concern:*

Be it known that I, JAMES SEARLE DAWLEY, a citizen of the United States, residing at New York, in the county of New York and State of New York, have invented certain Improvements in Methods of Preparing Films for Kinetoscopes, of which the following description, in connection with the accompanying drawings, is a specification, like reference characters on the drawings indicating like parts in the several figures.

This invention relates to methods of preparing positive films for use in moving picture projecting machines or kinetoscopes.

It is well known that by first exposing a film to a well illuminated object, for example a stage setting, and then exposing the film a second time to another object, for instance a person dressed in white, a negative may be produced such that when a positive is made from it and projected the person on which the second exposure was made will appear as a phantom or transparent image in the stage setting on which the first exposure was made.

An object of this invention is to provide a method by which distant and inaccessible places may be exhibited on a screen with the living and moving element added to them and without the necessity of the places being visited either by the moving picture protographer or by the living or moving element which appears in them as a phantom.

It has heretofore been impossible to produce such phantoms against a white or very light background, the delineation of the phantom being lost in those portions of the film which had previously been exposed to white. An object of this invention is to provide a method of obtaining a very well delineated phantom against a white background or, in brief, to photograph a white object on a white object and secure perfect delineation of both.

A further object of the invention is to provide a method by which the objects which are to appear in phantom may be photographed against a black background without detracting anything from the excellence and definition of the first picture taken on the film because of the reflection from the black background.

These and other objects of the invention will appear more fully from the following description when read in connection with the accompanying drawings and will be pointed out in the appended claims.

In the drawings—

Figure 1:
Figure 1 represents a picture to be used in this method.
Figure 2:
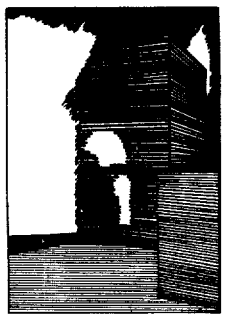
Fig. 2 represents a negative made from the picture of Fig. 1.
Figure 3:
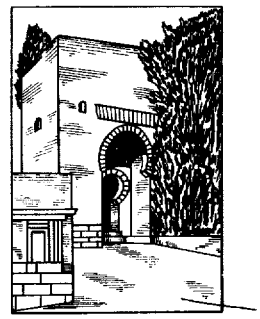
Fig. 3 represents a positive plate made from the negative of Fig. 2.

For the purpose of illustrating the manner in which the method of my invention may be carried out in practice, it will be assumed that it is desired to show upon the screen disembodied spirits of human beings as visiting various distant and wonderful places and buildings upon the earth. A print (Fig. 1) or photograph of the selected place is taken, for instance a white marble temple or shrine. This photograph is photographed in the usual manner upon a plate (Fig. 2) or film which may be either larger or smaller than the original picture. The negative thus obtained is placed in direct contact with a sensitive plate or film, exposed and developed, a positive 2 (Fig. 3) being thereby obtained in a manner similar to that in which lantern slides are produced. This positive 2 is placed in a box 4 with substantially its entire surface exposed outside the box. In the box lamps 6, 8 are arranged at the two ends of the picture and opaque plates 10, 12 are arranged so as to intercept any direct rays of light from the lamps which might fall upon the positive. The back of the box opposite to the positive has a white surface 14 to reflect the light toward the positive and preferably between the white surface 14 and the positive 2 a diffusing plate 16, which may be of ground glass, is arranged. To furnish the required brilliant lighting it is found that 250-watt tungsten or nitrogen lamps give satisfactory results.

Figure 4:
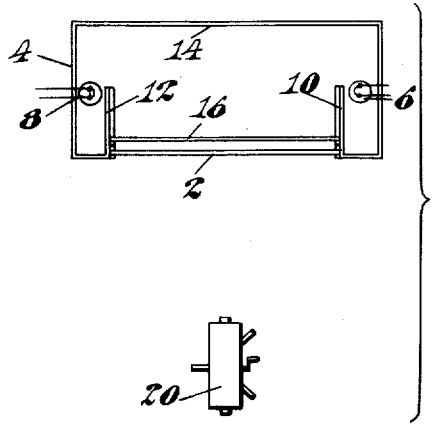
Fig. 4 represents the step of photographing on a moving film the positive of Fig. 3 while illuminating it from the back.

In front of the positive thus illuminated is placed a moving picture camera 20 of usual construction at the proper distance to cause the illuminated positive to cover the portion of the film exposed at one time. The camera 20 is then operated to expose the required length of film (Fig. 4). The film is then rewound, care being taken to mark the film so that when exposed a second time the area of each second exposure will coincide accurately with the first.

The persons $a$, $b$ or moving objects which are to appear as spirits or phantoms in the scene already taken are placed in front of a black background 22 which will reflect as little light as possible, for instance one of black velvet. If objects are to be photographed they are preferably white, and if persons are to appear they are dressed in white, their hair powdered, and the exposed portions of their skins whitened. Extremely powerful illumination is then thrown upon the persons $a$, $b$ or objects and the film is again exposed by operating the moving picture camera 20, the persons in the meantime acting the part of tourists viewing and enjoying the scenes represented on the positive to which the film has been previously exposed or going through any action appropriate to the background already on the film, the object being to cause them to form an integral part of the scene in which they are represented as performing. If the persons or objects in white which are being photographed are illuminated by powerful light coming from the front, the light will also fall upon the black background. When a black surface, no matter how nearly perfect the black may be, is thus illuminated and photographed, it will appear gray. Therefore, if such a brilliantly illuminated black surface is photographed on a film already exposed the contrast and definition of the first picture will be greatly reduced and the picture probably spoiled. To prevent this I arrange lights 24, 26, one at each side of the black background 22, in such a way that pencils of light fall upon the objects arranged in front of the background to be photographed but do not fall directly upon the background itself, the area covered by the pencils of light being controlled by diaphragms 28, 30. Preferably black wings 32, 34 are arranged to receive and absorb the light which passes the objects, these wings being outside of the field of the photograph. The persons $a$, $b$ may move about as desired in the field covered by the pencils of light from both the lights 24, 26 and the size of the field may be varied by the distance of the lights from the persons and by the size of the diaphragms 28, 30. The size of the phantom in proportion to the background is controlled by the distance of the camera 20 from the persons $a$, $b$.

Figure 6:
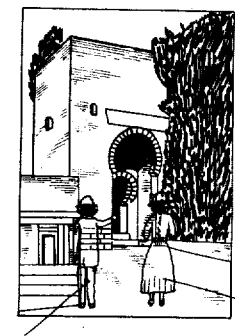
Fig. 6 represents the picture obtained by projecting a positive of the film obtained as shown in Fig. 5.
Figure 5:
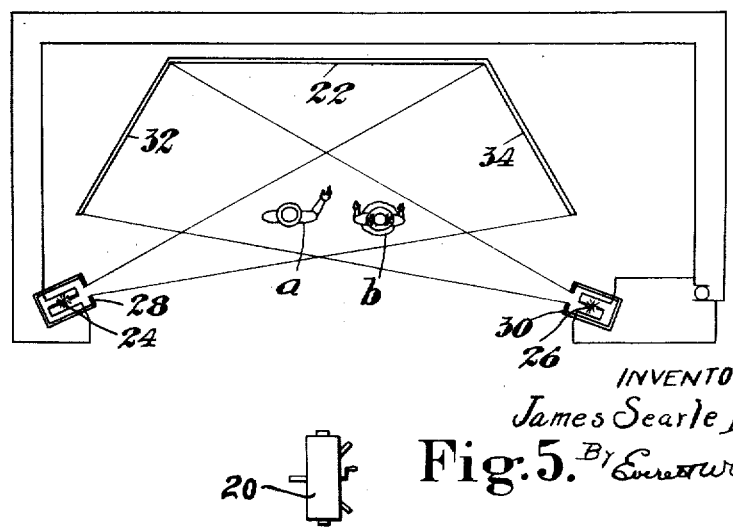
Fig. 5 represents the step of photographing upon the same film moving persons.

The film, having been exposed to the moving persons $a$, $b$, is developed and a positive film made therefrom in the usual manner. When this film is placed in the usual projection apparatus and thrown upon the screen, a picture such as indicated in Fig. 6 will appear, the phantoms $a'$, $b'$ being in action against a stationary background and all the details, both of the background and of the phantoms, being well delineated.

The degree and nature of the light used is very important in obtaining satisfactory results. The ordinary spotlight arc has only about 300 candle power and such lights are quie unsuitable for this purpose. Satisfactory results are possible only by the use of extremely powerful arcs of special construction. It is believed that arc lights similar to those manufactured by the Sperry Gyroscope Company for searchlights which have carbons of a special composition are the best now available. These arcs furnish a light of great actinic power closely approaching sunlight. In fact, the lamp designed and used for this purpose is known as the "sunlight arc." With these lamps 100,000 candle power per unit is obtainable with a consumption of current of 100 to 150 amperes at 110 volts, direct current being preferably used. It is found that as the amperage is increased above 100 the amount of light increases out of proportion to the amount of additional current used. This is due to the formation of a luminous gas in the crater of the negative carbon which gives a very intense light, the light being the closest approach to sunlight, in its spectrum and actinic properties, that is now known. In fact, with such lights it is possible to produce effects which could not be secured even by the use of direct sunlight. In some cases it may be found desirable to employ parabolic mirrors to concentrate the light and by this means candle power of a million or more may be obtained.

Having thus described my invention, what I claim as new and desire to secure by Letters Patent of the United States is:

1. That method of making positive films for use in moving picture projection apparatus which consists in brilliantly illuminating a positive from the back, photographing the positive repeatedly upon a film, rewinding the film, and again exposing the film to brilliantly illuminated living and moving objects in white against a substantially unilluminated black background.

2. That method of making positive films for use in moving picture projection apparatus which consists in preparing a positive of a white object, for example a white building, illuminating the positive from the back, photographing the positive repeatedly upon a film, rewinding the film, again exposing the film to white living and moving objects, and illuminating the living objects with so great intensity that both the original picture and the superposed moving picture will appear in clear delineation.

3. That method of making positive films for use in moving picture projection which consists in selecting a background picture, photographing the picture to obtain a negative, preparing from the negative a positive, illuminating the positive from the back and photographing it with a moving picture camera upon the required length of film, rewinding the film, indexing the film to cause the second exposure to coincide with the first, preparing in white moving objects to appear in the picture, placing them before a black background, then re-exposing the film to said objects while illuminating them by powerful lights thrown from the sides upon the objects and not upon the background, the light being far more intense per unit of area than that thrown upon the positive first photographed, and then preparing the positive film in the usual manner.

4. That method of making positive films for use in moving picture projection apparatus which consists in brilliantly illuminating a positive from the back, photographing the positive repeatedly upon a film, rewinding the film, again exposing the film to brilliantly illuminated moving objects in white against a substantially unilluminated black background, and then developing the film and printing positives therefrom.

5. That method of making positive films for use in moving picture projection apparatus which comprises preparing a positive of a still white object, illuminating the positive from the back, photographing the positive repeatedly upon a film, rewinding the film, again exposing the film to white moving objects, and illuminating said objects with great intensity to cause them to appear in clear delineation.

6. That method of making positive films for use in moving picture projection which consists in preparing a transparency from a selected still picture, illuminating the transparency from the back while photographing it with a moving picture camera upon the required length of film, preparing in white moving objects to appear in the picture, placing them before a black background, then re-exposing the film to said objects while illuminating said objects only and not the background, and then preparing a positive film in the usual manner.

In testimony whereof I have signed my name to this specification.

JAMES SEARLE DAWLEY.